United States Patent
Hymel et al.

[19]

[11] Patent Number: 6,157,814
[45] Date of Patent: Dec. 5, 2000

[54] WIRELESS SUBSCRIBER UNIT AND METHOD FOR PRESENTING ADVERTISEMENTS AS A MESSAGE INDICATOR

[75] Inventors: James Allen Hymel; Jack P. Indekeu, both of Lake Worth, Fla.

[73] Assignee: Motorola, Inc., Schaumburg, Ill.

[21] Appl. No.: 09/191,408

[22] Filed: Nov. 12, 1998

[51] Int. Cl.[7] ............................... H04Q 7/20; H04Q 7/32
[52] U.S. Cl. ..................... 455/31.1; 455/31.2; 455/5.1; 455/4.2; 455/550; 455/403; 455/566
[58] Field of Search .................................. 455/31.1, 31.2, 455/31.3, 5.1, 4.1, 4.2, 420, 566, 550, 403, 412, 414, 419, 422, 424

[56] References Cited

U.S. PATENT DOCUMENTS

| | | | |
|---|---|---|---|
| 4,385,295 | 5/1983 | Willard et al. ......................... | 455/31.3 |
| 5,278,546 | 1/1994 | Weitzen et al. ......................... | 455/566 |
| 5,671,267 | 9/1997 | August et al. ......................... | 455/420 |
| 5,848,352 | 12/1998 | Dougherty et al. ...................... | 455/4.2 |

*Primary Examiner*—Fan Tsang
*Assistant Examiner*—Keith Ferguson
*Attorney, Agent, or Firm*—Randi L. Dulaney; Philip P. Macnak; Daniel K. Nichols

[57] ABSTRACT

A wireless subscriber unit (30) contains an advertisement manager (56). The advertisement manager (56) is programmed to assign an advertisement icon (54) to a message indicator (46) on the display (42) of the wireless subscriber unit (30). Assignment of the advertisement icon (54) to the message indicator (46) associated with a message (26) may be based on a predetermined algorithm in the advertisement manager (56), or based on a notification received from the wireless communication system (10).

5 Claims, 4 Drawing Sheets

WIRELESS SUBSCRIBER UNIT AND METHOD FOR PRESENTING ADVERTISEMENTS AS A MESSAGE INDICATOR

FIELD OF THE INVENTION

This invention relates in general to wireless communication systems, and particularly, to wireless subscriber units having message indicators.

BACKGROUND OF THE INVENTION

Historically, wireless subscriber units, such as cellular telephones and pagers, have had the ability to receive a message sent from a wireless communication system, and perform standard functions in response to message receipt such as storing the message, displaying the message, or alerting the user of receipt of the message. The messages are typically a numeric message such as a phone number, or an alphanumeric message containing one unique piece of information such as "meeting in my office at 6:00 pm."

The user is alerted of receipt of a new message by an audible alert or a vibratory alert. The display of many wireless subscriber units today includes a message indicator for each message it has received and stored in memory. This message indicator allows a quick view for the user of how many messages are in the wireless subscriber unit and also allows the user to quickly pick a message to view. The message indicator is typically a simple graphical object such as a triangle or an arrow.

Today, wireless service providers are teaming up with advertisers to provide advertisements on wireless subscriber units. The advertisers benefit from such partnerships by being able to send advertising messages to a large number of potential consumers in a cost effective manner. Advertisements can be sent as an individual alphanumeric message, or as an attachment to another alphanumeric message such as a free information service message.

One drawback to sending advertisements as an individual message or an attachment to the free information service message is that the user can delete the message without ever reading it. Alternatively, the user can begin to read the message, see that it is an advertisement, and delete it.

Another drawback to sending alphanumeric advertisement messages is the annoyance factor of the wireless subscriber user. The disturbance created for the end user can negate any positive benefits to the advertiser.

Hence, what is needed is a non-intrusive method for advertising to the end user of wireless subscriber units that provides for multiple viewing hits of the same advertisement.

DESCRIPTION OF THE PREFERRED EMBODIMENT

Figure 1:
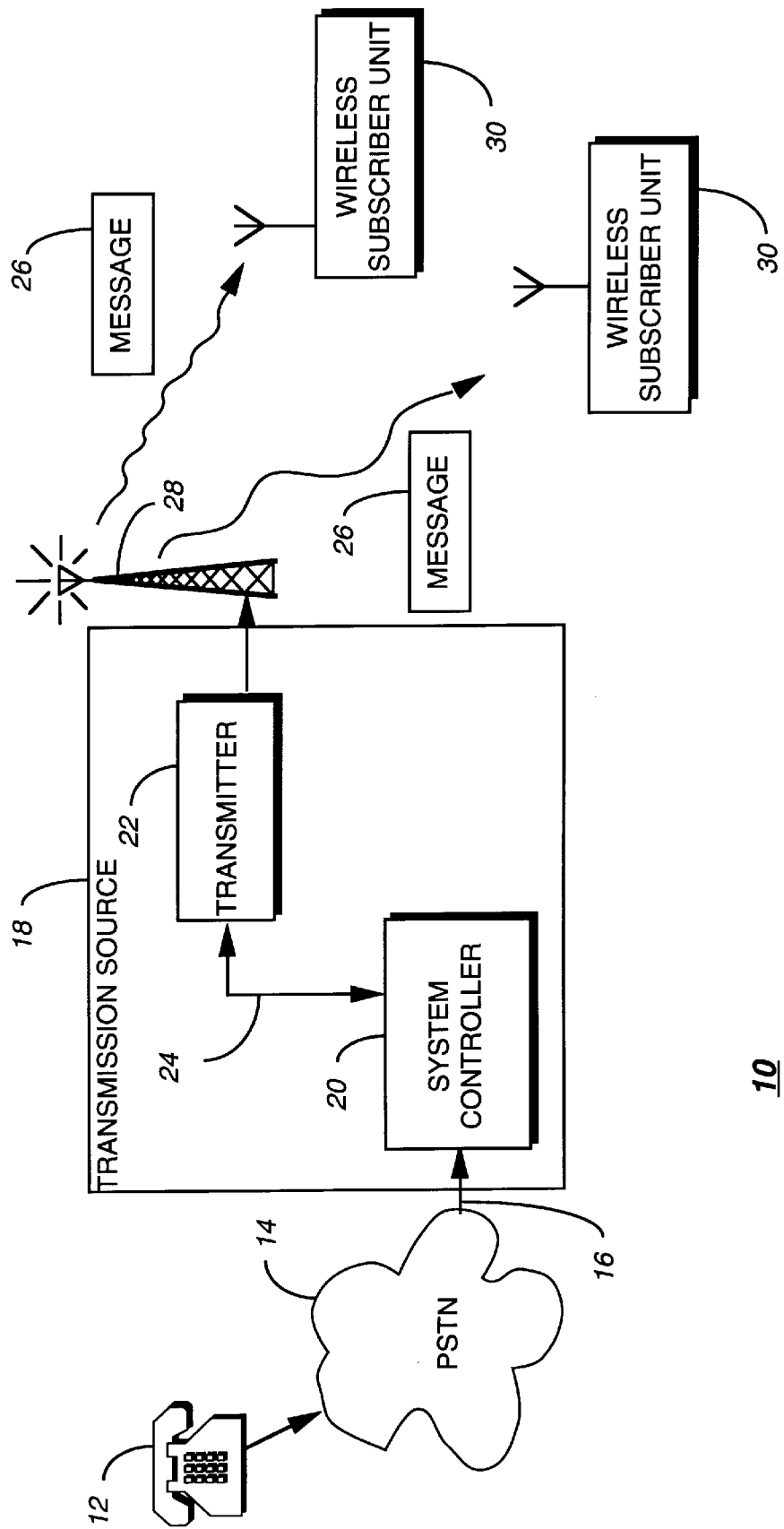
FIG. 1 is an electrical block diagram of a wireless communication system.

Referring to FIG. 1, an electrical block diagram of a wireless communication system 10 is shown. The wireless communication system 10 comprises a message input device, such as a telephone 12 connected through a conventional switched telephone network (PSTN) 14 by conventional telephone links 16 to a transmission source 18.

The transmission source 18 includes a system controller 20 and at least one system transmitter 22. The system controller 20 oversees the operation of the system transmitter 22 through one or more communication links 24, which typically are twisted pair telephone wires, and additionally can include RF, microwave, or other high quality audio communication links. The system controller 20 encodes and decodes inbound and outbound telephone addresses into formats that are compatible with landline message switch computers. The system controller 20 also functions to digitally encode and schedule outbound messages such as a message 26, for transmission by the system transmitter 22 via the system transmit antenna 28 to a plurality of wireless subscriber units 30, on at least one outbound radio frequency (RF) channel.

It will be appreciated that the wireless communication system 10 may function utilizing any wireless RF channel, for example, a one or two way pager channel, a mobile cellular channel, or a mobile radio channel. In the following description, the wireless communication system 10 refers to any of the wireless communication systems listed above or an equivalent. Each wireless subscriber unit 30 assigned for use in the wireless communication system 10 has an address assigned thereto which is a unique selective call address in the wireless communication system 10. The address enables the transmission of a message 26 from the system controller 20 only to the addressed wireless subscriber unit 30, and identifies the messages and responses received at the system controller 20 from the wireless subscriber unit 30. A list of the assigned addresses for each of the wireless subscriber units 30 is stored in the system controller 20 in the form of a subscriber database.

Figure 2:
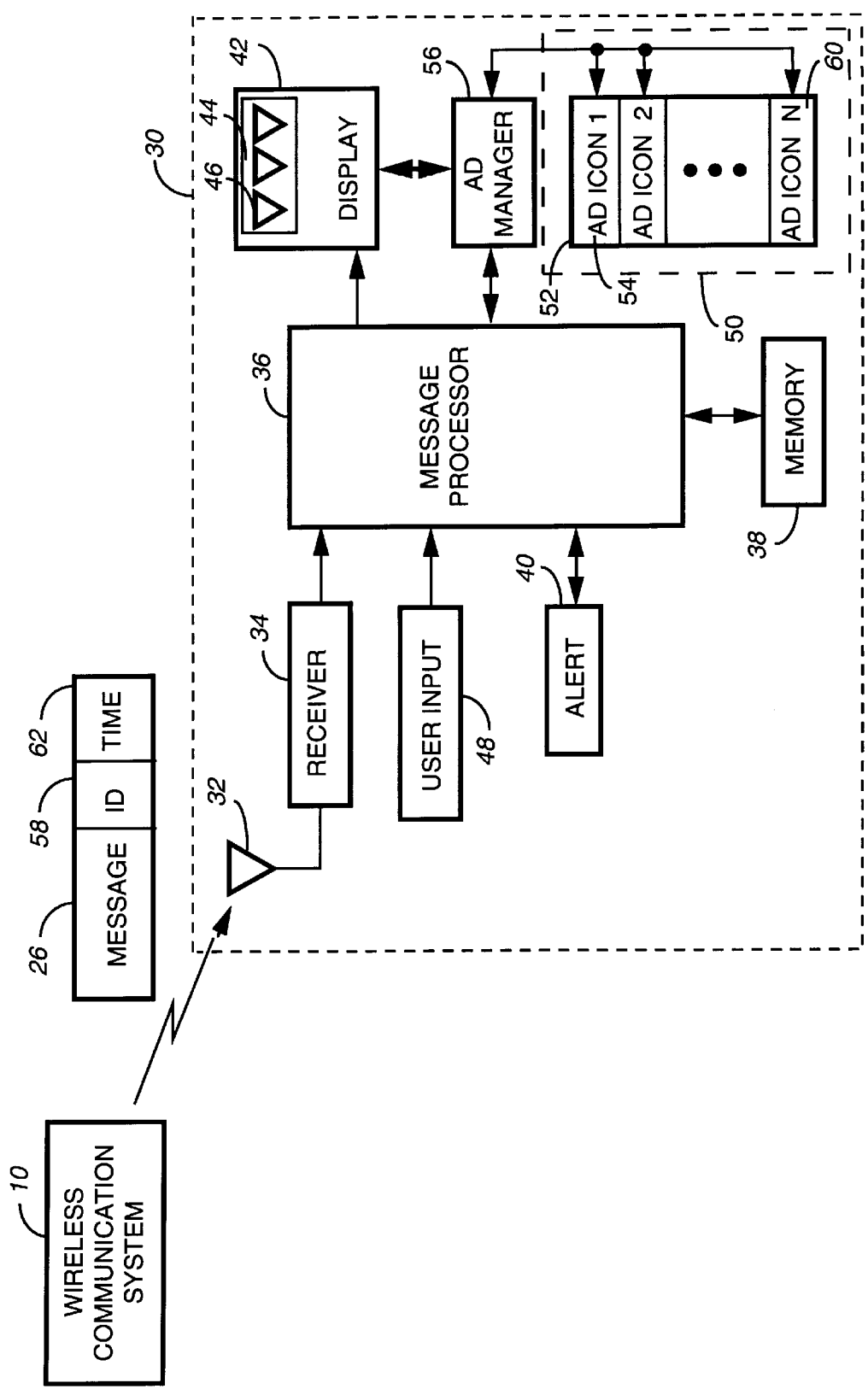
FIG. 2 is an electrical block diagram of a wireless subscriber unit that operates within the wireless communication system of FIG. 1 in accordance with the invention.

FIG. 2 is an electrical block diagram of the wireless subscriber unit 30 that operates within the wireless communication system 10 of FIG. 1. The wireless subscriber unit 30 comprises an antenna 32 for intercepting RF signals from the wireless communication system 10. The antenna 32 is coupled to a receiver 34 employing conventional demodulation techniques for receiving the communication signals transmitted by the wireless communication system 10 such as the message 26. Radio frequency signals received by the receiver 34 produce demodulated information, which is coupled to a message processor 36 for processing received messages.

To perform the necessary functions of the wireless subscriber unit 30, the message processor 36 is coupled to a memory 38 including a random access memory (RAM), a read-only memory (ROM), and an electrically erasable programmable read-only memory (EEPROM). Preferably, the message processor 36 is similar to the MC68328 microcontroller manufactured by Motorola, Inc. It will be appreciated that other similar processors can be utilized for the message processor 36, and that additional processors of the same or alternative type can be added as required to handle the processing requirements of the message processor 36.

The message processor 36 decodes an address in the demodulated data of the received message 26, compares the decoded address with one or more addresses stored in the memory 38, and when a match is detected, proceeds to process the remaining portion of the message 26. Once the message processor 36 has processed the message 26, it stores the message 26 in the memory 38. The message processor 36 also sends a command to the alert 40 to notify the user that a message has been received. This alert may be an audio alert (e.g. speaker or transducer) or a tactile alert (e.g. vibrator). It will be appreciated that other alerting mechanisms are also possible.

The display 42 includes a plurality of message indicators 44. When the display 42 receives a command from the message processor 36 that a new message 26 has been received and stored in memory 38, a message indicator 46 is activated. Selection by the end user via the user input 48 of the message indicator 46 associated with the message 26 will display the message 26 on the screen. To take advantage of the present invention, the display 42 is preferably a high resolution graphics liquid crystal display. It will be appreciated that other similar displays can be utilized for the display 42.

In a preferred embodiment, the wireless subscriber unit 30 includes an advertisement memory 50 that stores a plurality of advertisement icons 52. Each advertisement icon 54 comprises a thumbnail graphical depiction, or a reduced size graphical depiction, of a particular advertiser's symbolism. For example, the advertisement icon associated with Motorola may be the Motorola batwing symbol. The advertisement memory preferably is an electrically erasable programmable read-only memory (EEPROM), however, any alternative memory may be used. The advertisement icons 52 may be programmed into the advertisement memory 50 via a memory programmer unit at the service provider, via over the air programming methods from the service provider, or any other equivalent manner.

Storing the advertisement icon in memory for later use increases the throughput and efficiency of the service provider's network over conventional methods of sending the advertisement message along with a personal or information service message. The advertisement icons can be programmed off of the channel or during low traffic periods of time, thus allowing an efficient and cost effective method to both the advertiser and the service provider.

The wireless subscriber unit 30 preferably also includes an advertisement manager 56. Preferably, the advertisement manager 56 is similar to the MC68328 micro-controller manufactured by Motorola, Inc. It will be appreciated that additional processors of the same or alternative type can be added as required to handle the processing requirements of the advertisement manager 56.

The advertisement manager 56 is programmed to assign advertisement icons 52 to the message indicators 44 on the display 42. The assignment of the advertisement icon 54 to the message indicator 46 associated with the message 26 may be based on a message number, a message keyword, a message type, a message topic, or any other message characteristic defined by the service provider, the end user, or the advertiser.

Using advertisement icons as message indicators increases the advertisers' ability for subconscious repetition of an advertisement to end users of the wireless subscriber unit (30). Easy to implement facilitation of a method for increased brand recognition provides an incentive to the advertisers to subsidize the wireless service, lowering the overall cost of the service to the end user, increasing the value of the service, aiding in the growth of the wireless industry.

In one embodiment, the message 26 includes a message identification number 58, the advertisement icon 54 includes an advertisement identification number 60, and the advertisement manager 56 assigns the advertisement icon 54 to the message indicator 46 by matching those identification numbers.

Alternatively, the message 26 includes a time duration 62 and the advertisement icon 54 is assigned to the message indicator 46 based on the time duration 62.

The advertisement icons 52 in the advertisement memory 50, may be updated by the service provider sending update messages to the wireless subscriber unit 30, the message processor 36, upon receipt of an update message, will send a command to the advertisement manager 56 with the new advertisement icon data. The advertisement manager 56 then stores this new advertisement icon 54 into the advertisement memory 50 for later use.

Figure 3:
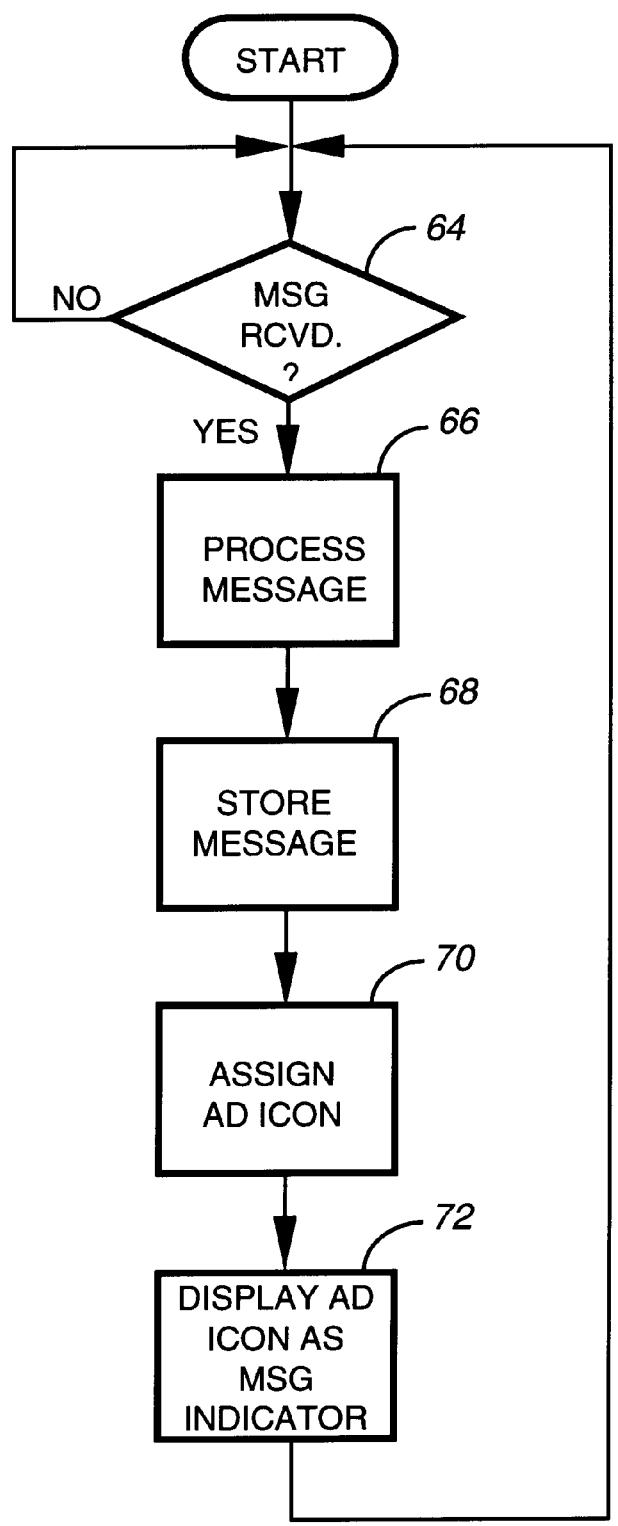
FIG. 3 is a flow chart illustrating the operation of the wireless subscriber unit of FIG. 2.

FIG. 3 is a flow chart illustrating how the wireless subscriber unit 30 operates in accordance with the invention. The wireless subscriber unit 30 remains in a stand-by mode awaiting receipt of the message, in step 64. When a message 26 is received, the message is processed in step 66. Processing includes matching the message address to the address stored in the wireless subscriber unit 30, and alerting the user if the message address matches using the alert 40, as described earlier. The message 26 is also stored in memory 38, step 68. After storing the message 26 in memory, the message indicator 46 is activated on the display 42. Prior to activating the message indicator, 46, the advertisement manager 56 assigns the advertisement icon 54 to be used as the message indicator 46, in step 70, for the received message 26. Next, in step 72, the advertisement icon 54 is displayed as the message indicator 46 for the received message 26 on the display 42. The process then cycles back to the beginning and the wireless subscriber unit 30 continues checking for receipt of another message.

Figure 4:
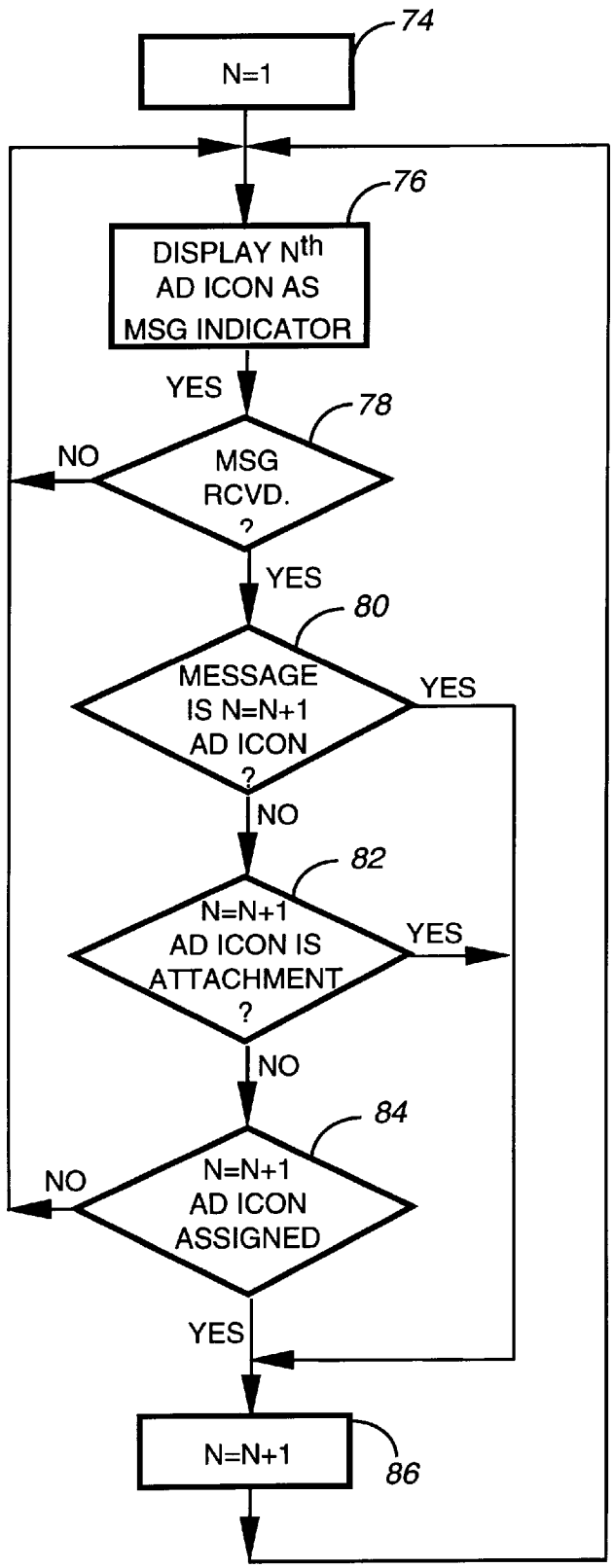
FIG. 4 is a flow chart illustrating more detail of the operation of the wireless subscriber unit of FIG. 2.

FIG. 4 is a flow chart illustrating more detail of how the advertisement manager 56 is programmed to assign the advertisement icon 54 to the message indicator 46 for the message 26. In step 74, a variable N is set to the number one for tracking and explanation purposes. In step 76, the advertisement manager 56 assigns the Nth advertisement icon as the message indicator 46 for the received message 26. The wireless subscriber unit 30 continues to check for receipt of a message in step 78. If no new message is received, the advertisement manager 56 continues to use the Nth advertisement icon as the message indicator 46 to be displayed. If a message is received, the advertisement manager 56 checks if the message is a notification of an N+1 advertisement icon in step 80. If the message is a notification of an N+1 advertisement icon, the variable N is incremented to N+1 and the new N+1 advertisement icon is stored in the advertisement memory 50 to be used as the next message indicator to be displayed. If the message is not a notification, the advertisement manager 56 checks to see if the N+1 advertisement icon notification is attached to the received message, step 82. If the message does include an attachment that is the notification of the N+1 advertisement icon, the variable N is incremented to N+1 and the new N+1 advertisement icon is stored in the advertisement memory 50 to be used as the next message indicator to be displayed. The attachment may also include a time duration 62, or a category, or an identification ID to further characterize the use of the new advertisement icon. If the message does not include an attachment of a notification of the N+1 advertisement icon, in step 84, the advertisement icon N+1 may be assigned by the advertisement manager 56 using a predetermined algorithm or set of rules. If the advertisement manager 56 does not include a predetermined algorithm for assignment, the process returns to the beginning and the current advertisement icon continues to be displayed as the message indicator 46. If the advertisement manager 56 includes a predetermined algorithm, the advertisement icon is incremented to N+1 using this algorithm and the process returns to the beginning where the message indicator 46 displayed is the current advertisement icon.

Advertisement icons as replacements for message indicators facilitate the ability of the end user to navigate through his/her messages when the advertisement icons are assigned based on message topics or categories. The display of the wireless subscriber unit also becomes more visually stimulating to the end user than a traditional display of message indicator arrows or other geometric shape. The familiarity of the technologically astute end user of today to a display containing advertisement graphics in media such as the internet increases the value of the described invention to the wireless subscriber unit user community.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. A wireless subscriber unit for receiving a message from a wireless communication system, comprising:
    a receiver for receiving the message;
    a message processor coupled to the receiver for processing the message;
    a memory coupled to the message processor for storing the message;
    a display coupled to the message processor for displaying the message, the display providing:
        a plurality of message indicators, wherein a message indicator associated with the message is activated in response to receipt of the message;
    an advertisement memory for storing a plurality of advertisement icons; and
    an advertisement manager coupled to the advertisement memory and coupled to the display for assigning an advertisement icon to the message indicator activated in association with the message; and
    a user input for selecting the advertisement icon associated with the message, wherein the message is displayed on the display in response to the selection by the user input.

2. A wireless subscriber unit as recited in claim 1, wherein:
    the message includes a message identification number;
    the advertisement icon includes an advertisement identification number; and
    the advertisement manager assigns the advertisement icon to the message indicator by matching the message identification number with the advertisement identification number.

3. A wireless subscriber unit for receiving a message from a wireless communication system, comprising:
    a receiver for receiving the message, wherein the message includes an advertisement icon;
    a message processor coupled to the receiver for processing the message;
    an advertisement manager coupled to the message processor for processing the advertisement icon;
    an advertisement memory coupled to the advertisement manager, receiving the advertisement icon from the advertisement manager and storing the advertisement icon;
    a display coupled to the advertisement manager and coupled to the message processor for displaying a stored message, the display providing:
        a plurality of message indicators, wherein a message indicator associated with the message is activated in response to receipt of the message;
    wherein the advertisement manager assigns the advertisement icon to the message indicator activated in association with the message; and
    a user input for selecting the advertisement icon associated with the message, wherein the message is displayed on the display in response to the selection by the user input.

4. A wireless subscriber unit as recited in claim 3, wherein the message further comprises a message identification number, and wherein the advertisement manager assigns the advertisement icon to the message indicator using the message identification number.

5. A wireless subscriber unit as recited in claim 3, wherein the message further comprises a time duration, and wherein the advertisement manager assigns the advertisement icon to the message indicator using the time duration.

* * * * *